United States Patent [19]

Hayes

[11] Patent Number: 4,479,676
[45] Date of Patent: Oct. 30, 1984

[54] METHOD AND APPARATUS FOR CHANNELLING AIR THROUGH A MOTORCYCLE FAIRING

[76] Inventor: Kenneth W. Hayes, Rt. 4, Box 243, Elizabethtown, Tenn. 37643

[21] Appl. No.: 495,516

[22] Filed: May 17, 1983

[51] Int. Cl.$^3$ .............................................. B62J 17/00
[52] U.S. Cl. ................................ 296/78.1; 280/289 S
[58] Field of Search .............................. 296/78.1, 1 S; 280/289 S

[56] References Cited

U.S. PATENT DOCUMENTS

| | | | |
|---|---|---|---|
| 4,130,315 | 12/1978 | Shields | 296/78.1 |
| 4,135,758 | 1/1979 | Clements | 296/78.1 |
| 4,173,033 | 12/1979 | Muth et al. | 296/78.1 |
| 4,331,358 | 5/1982 | Johnson et al. | 296/78.1 |

*Primary Examiner*—Robert R. Song
*Attorney, Agent, or Firm*—Burns, Doane, Swecker & Mathis

[57] ABSTRACT

The present invention relates to a method and apparatus for channelling air through openings in a motorcycle fairing. The air channelling apparatus includes an air scoop having an inlet opening for communication with an interior of the air scoop and a mounting mechanism for securing the air scoop adjacent to the openings in the fairing. The mounting mechanism permits both rotation of the air scoop and limited movement of the air scoop away from the fairing. With the inlet opening facing forwardly, ambient air is channelled by the air scoop through the openings in the fairing and into an air space behind the fairing. The ambient air is then selectively directed through an outlet of the air space toward the rider. With the inlet opening of the air scoop facing rearwardly, a portion of the air heated from the engine components flow through the air space toward the openings in the fairing, while a remaining portion flows toward the outlet which directs the heated air toward the rider.

20 Claims, 7 Drawing Figures

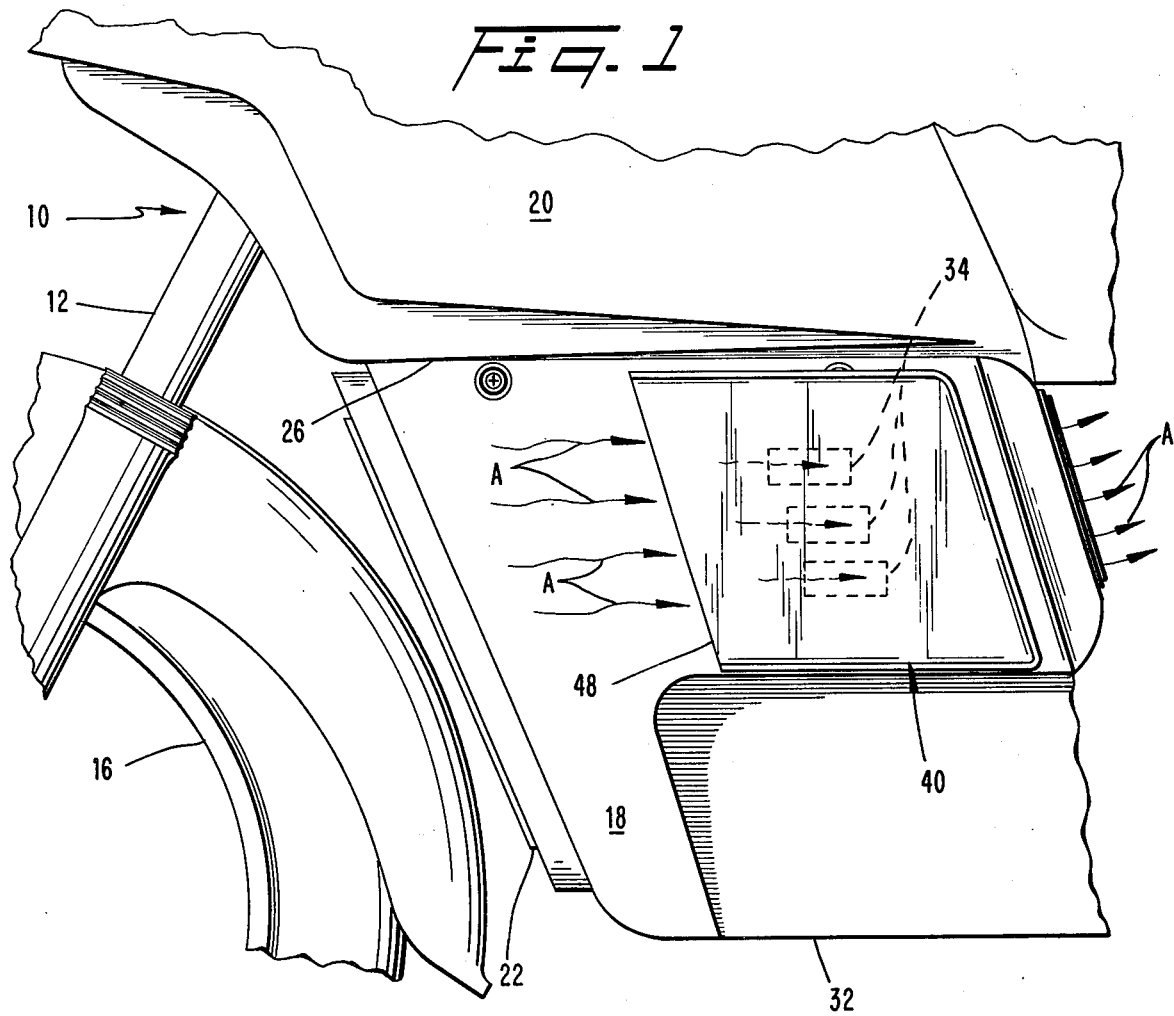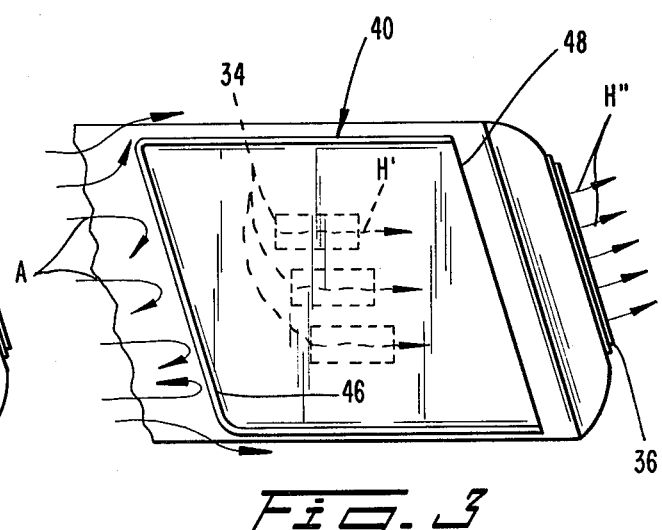

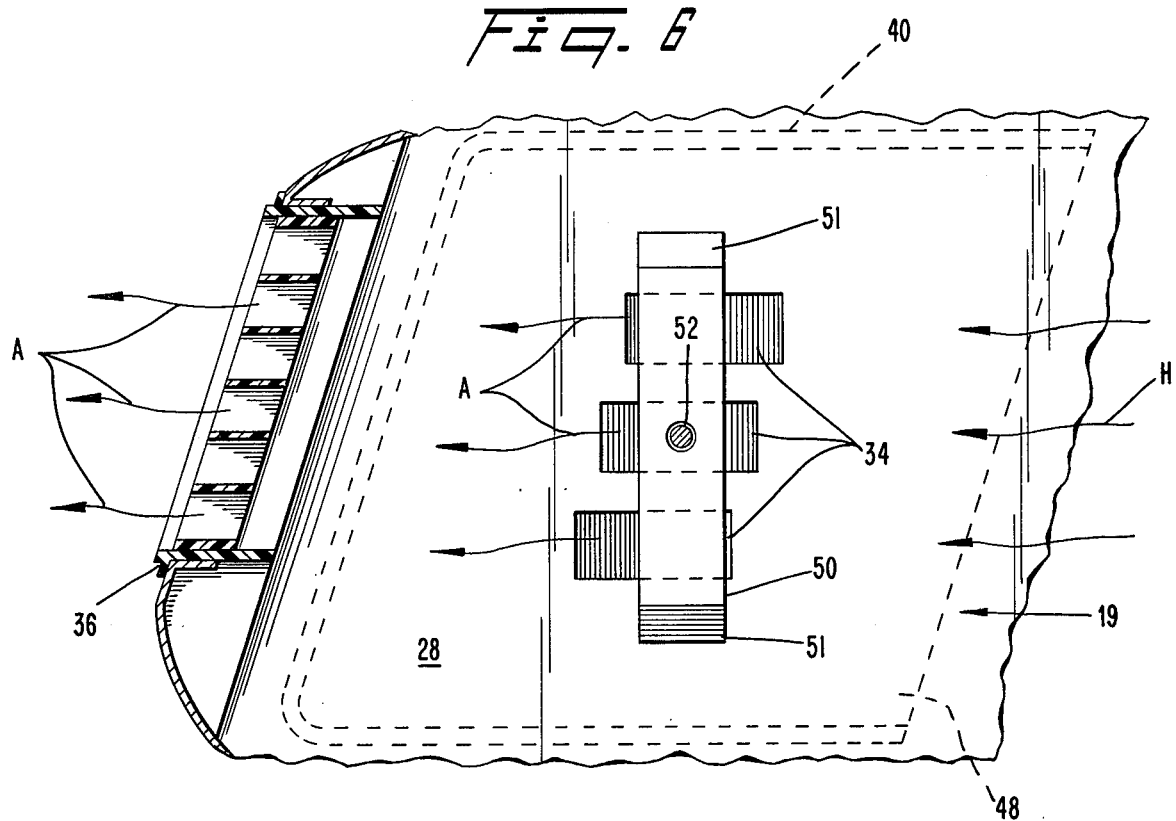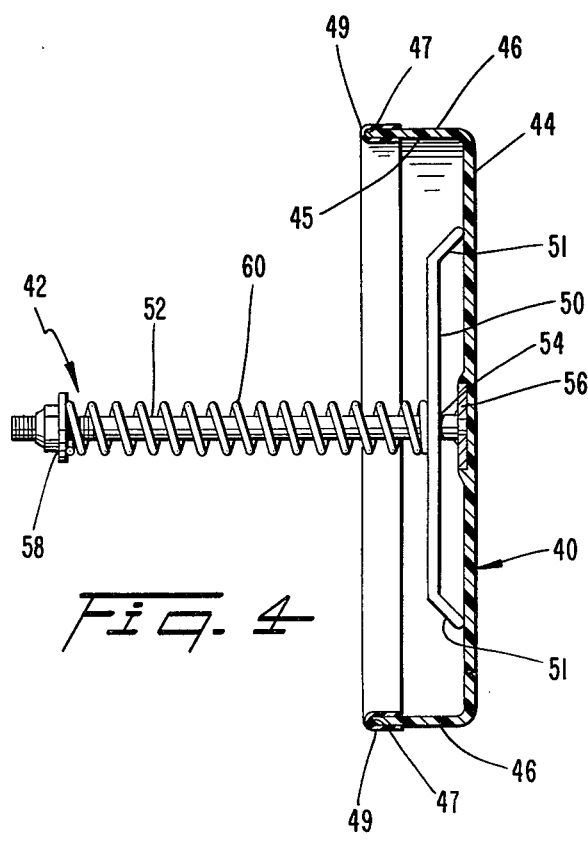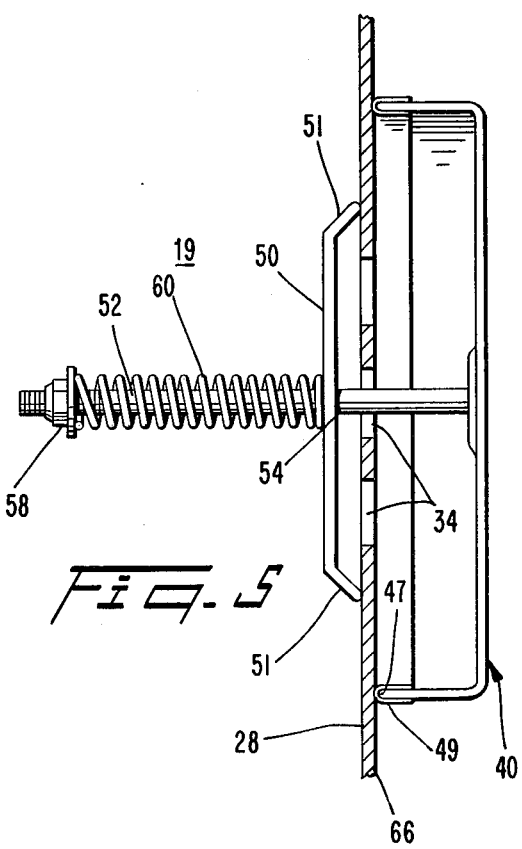

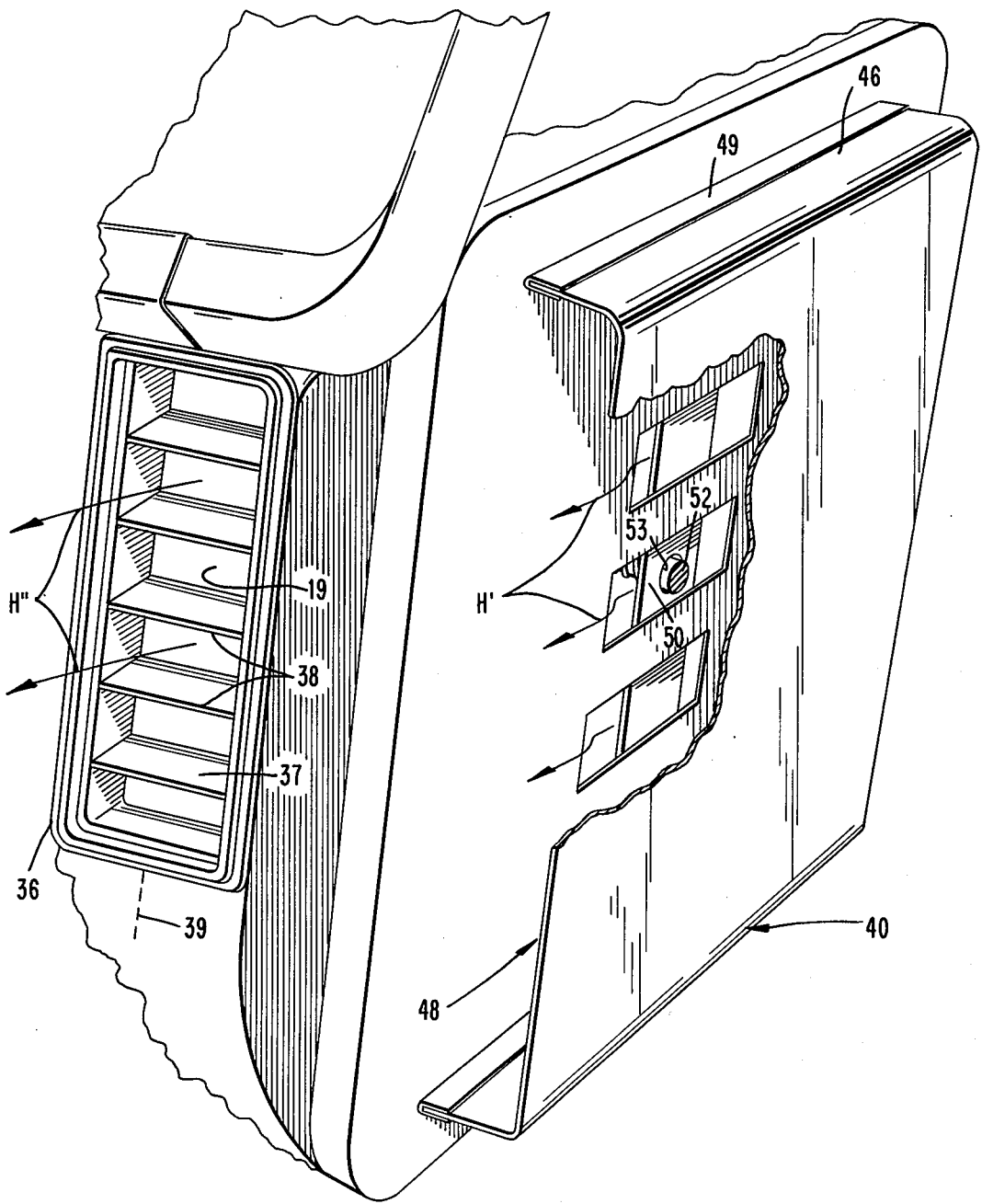

METHOD AND APPARATUS FOR CHANNELLING AIR THROUGH A MOTORCYCLE FAIRING

BACKGROUND AND SUMMARY OF THE INVENTION

The present invention relates to a method and apparatus for selectively channelling air through a motorcycle fairing. More particularly, the present invention relates to an air channelling device for attachment to a motorcycle fairing and a method for selectively channelling heated or ambient air toward a motorcycle rider.

Conventional motorcycles encounter significant air resistance from a windstream created while travelling. The air resistance can be reduced by providing the motorcycle with a smooth aerodynamic fairing which deflects the windstream to the sides of the motorcycle. In addition, such a fairing on a motorcycle protects the rider from the windstream created while travelling.

The fairings are attached to a front of the motorcycle frame. Generally, the fairing includes a curved sheet of metal or fiberglas oriented in a generally vertical plane and attached to the motorcycle frame in front of the handlebars. A transparent windshield portion is arranged on an upper portion of the fairing to protect the upper body of the rider. The fairing may also include separate lower extensions located on each side of the motorcycle frame for protecting the lower body of the rider. Both the windshield portion and the lower extensions curve toward a rear of the motorcycle along a portion of the sides of the motorcycle. During movement of the motorcycle, the fairing presents a smooth aerodynamic face to the windstream while protecting the rider from the windstream by deflecting air which would normally impinge on the rider to the sides of the travelling motorcycle.

In order to ensure an air flow from the engine components and the radiator, the fairing is spaced from the motorcycle frame to define a curved longitudinal space between the motorcycle engine and the fairing. The space has a top wall defined by an upper portion of the fairing and two sides defined by the motorcycle engine and the fairing. The space is open at its bottom for communication with the atmosphere. A plurality of openings or air vents may be provided through the fairing to permit additional communication with the atmosphere. Heated air from the motorcycle engine and radiator enters the space and flows therethrough toward the sides of the motorcycle. The heated air escapes to the atmosphere through the bottom and air vents. In this manner, the fairing channels the heated air so that it does not impinge on the rider. A fairing of this general type is provided on various motorcycles including the Honda Gold Wing Interstate Motorcycle and the Honda Gold Wing Aspencade Motorcycle.

While the fairing reduces air resistance and protects the rider from the windstream, the cooling or breeze effect caused by the impingement of the ambient air on the rider is eliminated. In an effort to provide a cooling sensation to motorcycle riders, a known fairing (e.g., the Honda Gold Wing Interstate and Aspencade Motorcycles) is provided with air tubes which extend through an upper part of the fairing on opposite sides of the frame. Portions of the windstream enter the air tubes and are directed to outlet air louvers which are selectively adjustable to direct the air toward the upper body of the rider.

In addition, motorcycle fairings have been provided with pivotable vents for deflecting ambient air towards the rider in order to provide a cooling sensation to the rider. A fairing having pivotable vents is disclosed in U.S. Pat. No. 4,130,315 issued to Shields. The pivotable vents can be closed to prevent the ambient air from contacting the rider. The closing of the air tubes and vents normally occurs when the rider desires to be warm.

The above-described fairings, however, do not provide an arrangement for channelling cooling ambient air toward the lower body of the rider. In addition, the above-described fairings do not provide for directing heated air toward the rider in order to provide a heating sensation to the rider. Further, the above-described fairings do not provide for the selective channelling of either heated or ambient air toward the rider in order to warm the rider during winter months or cool the rider during summer months, respectively.

Accordingly, it is an object of the present invention to provide a motorcycle fairing with an air channelling apparatus which overcomes the difficulties associated with the prior art.

It is another object of the present invention to provide an apparatus and method for channelling ambient air through a motorcycle fairing toward a rider in order to provide the rider with a cooling effect due to the breeze of ambient air.

Another object of the present invention is to provide a method and apparatus for channelling heated air toward the rider.

It is another object of the present invention to provide a method and apparatus for selectively channelling ambient air or heated air toward the rider.

Another object of the present invention is to provide an air channelling apparatus which is relatively easy to construct and attach to a motorcycle fairing.

It is a further object of the present invention to provide an air channelling apparatus which is readily selectively positioned in either a first position for channelling ambient air toward the rider or a second position for channelling heated air toward the rider.

The apparatus according to the present invention includes an air scoop having an inlet opening for communicating with an interior of the air scoop which interior communicates with openings in a fairing. A mounting arrangement urges the air scoop against the fairing adjacent to the openings but permits rotation of the air scoop through at least 180° and limited movement of the air scoop away from the fairing.

In a preferred embodiment, the air channelling apparatus is mounted on a fairing which is spaced from the motorcycle to define a longitudinal air space therebetween. The openings in the fairing communicate with the air space. Air heated from engine components is channelled rearwardly through the air space to escape to the surrounding atmosphere through the bottom of the air space. An air outlet is located at a rearward end of the air space for directing air in the air space toward the motorcycle rider. Heated air may be selectively directed toward the rider when the inlet opening of the air scoop faces rearwardly, while relatively cool ambient air is directed toward the rider when the inlet opening of the air scoop faces forwardly.

The present invention also relates to a method for selectively channelling air toward a rider of a motorcycle having a fairing spaced from the sides of the motorcycle to define an air space therebetween. The method includes the step of blowing air heated by engine components through the air space toward at least one opening provided through the fairing which opening communicates with the air space. An air scoop mounted on the fairing adjacent to the openings is selectively positioned in one of a first and second positions for selectively channelling air flow through the openings. The first position channels ambient air through the openings and the second position prevents ambient air from flowing through the openings. The air flow in the air space is then directed through an outlet duct toward the rider.

BRIEF DESCRIPTIONS OF THE DRAWINGS

A preferred embodiment of the present invention will be described hereinafter with reference to the accompanying drawings wherein like elements bear like reference numerals, and wherein:

FIG. 1 is a side view of a portion of a motorcycle with the air channelling apparatus of the present invention;

FIG. 2 is an enlarged side view of a portion of the motorcycle of FIG. 1 illustrating the rotation of the air scoop from a first position of FIG. 1 toward a second position;

FIG. 3 is a view similar to FIG. 2 illustrating the air scoop in the second position;

FIG. 4 is a cross-sectional view of the air scoop of the present invention;

FIG. 5 is a cross-sectional view of the air scoop of FIG. 4 mounted on a sidewall of the fairing lower extension;

FIG. 6 is an enlarged side view of the air channelling apparatus taken from behind the fairing; and FIG. 7 is a perspective view of the air channelling apparatus.

DETAILED DESCRIPTION OF THE PREFERRED EMBODIMENT

The air channelling apparatus of the present invention is adapted to be mounted on a motorcycle having a fairing with lower extensions. As illustrated in FIG. 1, the motorcycle 10 includes, inter alia, a frame carrying an engine (not shown) and having a front wheel 16 attached to a forward fork 12 of the motorcycle frame. A fairing 20 includes lower extensions 18 mounted on each side of the frame behind a motorcycle radiator 22. The lower extensions 18 curve toward a rear of the motorcycle along a front portion of both sides of the motorcycle. While further reference will be to one side of the motorcycle, it is apparent that the air channelling apparatus of the present invention is preferably provided on each side of the motorcycle.

Preferably, the lower extension 18 of the fairing 20 is spaced from the side of the motorcycle in order to define a curved longitudinal air space 19 (FIGS. 5 and 6) between the motorcycle frame and an internal sidewall 28 of the lower extension 18. The air space 19 has a top wall 26 defined by an upper portion of the fairing 20 and two sides, respectively defined by the internal sidewall 28 of the lower extension 18 and the motorcycle frame. A bottom 32 of the air space 19 is open for communication with the surrounding atmosphere.

The air space approximately extends from the motorcycle radiator 22 to an end 24 of the fairing remote from the radiator 22. On conventional motorcycles, the end 24 is closed, usually by a portion of the fairing 18 which is often made of sheet metal. Accordingly, air flowing within the air space is blocked from flowing through the end 24.

In conventional operation, air heated by engine components, such as the radiator 22, flows into the air space 19. The heated air then flows through the air space and escapes to the surrounding atmosphere through the open bottom 32 of air space 19. The end 24 prevents the heated air from flowing therethrough toward the rider.

The above-described fairing 20 with lower extensions 18 is similar to the type provided on various motorcycles such as the Honda Gold Wing Interstate and the Honda Gold Wing Aspencade. While the air channelling apparatus of the present invention is particularly adapted for mounting on the above-mentioned Honda motorcycles, the apparatus may be readily adapted to any similar motorcycle fairing.

As described above, the heated air is directed through the bottom of the air space so as not to impinge on the rider. In addition, the lower extensions of the fairing deflect ambient air from the windstram to the sides of the motorcycle. As a result, the lower body of the rider is not provided with any apparatus or method for selectively directing either heated or cool air toward the rider.

In accordance with the present invention, an apparatus is provided to direct either heated or cool air toward the rider. A generally rectangular aperture is cut at the rearward end 24 of the air space 19. As illustrated in FIGS. 1 and 7, a selectively closable outlet duct 36 is arranged in the aperture to direct air toward the rider. The outlet duct 36 thus provides a passage for directing air passing through the air space 19 toward the rider.

In a preferred form, the outlet 36 (FIG. 7) has a plurality of overlapping louvers 38, each of which pivots about a horizontal axis 37 for opening and closing the outlet duct 36. When partially open, the louvers 38 direct air in either an upward or downward direction as the air passes through the outlet duct 36. In addition, it is preferable to have the outlet duct 36 pivot about a vertical axis 39 in order to direct air either toward or away from the side of the motorcycle.

In addition, the lower extension 18 is provided with at least one opening 34 therethrough. The opening 34 may be a pre-existing opening or may be cut through the fairing with suitable tools. It is noted that the above-mentioned Honda motorcycles are provided with pre-existing openings through the fairing. As shown in FIG. 1, three rectangular openings 34 are provided. However, any number of openings may be utilized, provided that the openings provide sufficient area to allow a reasonable quantity of air to pass therethrough without substantial restriction.

With reference to FIG. 4, in order to channel ambient air into the air space 19, the present invention includes an air scoop 40 having a mounting mechanism 42 for attaching the air scoop 40 onto the fairing lower extension 18.

The air scoop 40 has a covering wall 44 and a skirt 46 depending from a portion of the covering wall 44. The skirt 46 and covering wall 44 define an interior of the air scoop 40. Free edges 47 of the skirt 46 may be provided with a gasket 49 for protecting the fairing 20 from being scratched by free edges 47. It is noted that the gasket 49 also seals the air scoop 40 against the fairing 20.

The air scoop 40 may have any configuration adapted for the particular fairing to which it is attached. Preferably, the covering wall 44 is a parallelogram and the skirt 46 depends from each of three edges of the covering wall 44 in a direction perpendicular thereto. An inlet opening 48 for communicating with the interior of the air scoop 40 is defined by a fourth edge of the covering wall 44 and ends 45 of the skirt 46. The air scoop 40 is preferably made from a plastic material such as fiberglas may be utilized if desired.

The mounting mechanism 42 includes a bolt 52 having one end secured to a central portion of the covering wall 44. As illustrated in FIG. 4, the end of the bolt 52 is secured to a mounting plate 56 and both the mounting plate 56 and the end of the bolt 52 are mounted within the covering wall 44. In a preferred embodiment, the mounting plate 56 and the end of the bolt 52 are molded within the covering wall 44.

A backing plate 50 is slidably received on the bolt 52. An aperture 53 in the backing plate 50 is provided in order to slidably mount the backing plate 50 on the bolt 52. A bushing 54, such as a plastic tube, may be provided along the bolt to reduce sliding friction between the bolt 52 and the backing plate 50. The backing plate 50 may be bar stock having a length sufficient to extend across the openings 34 in the fairing 20. Ends of the backing plate 50 are angled to form leg sections 51 which maintain the backing plate 50 spaced from the covering wall 44. However, the backing plate 52 should have a width which does not significantly block or obstruct the openings 34.

A spring 60 surrounds the bolt 52 behind the backing plate 50. The spring 60 urges the backing plate 50 toward the air scoop 40. It is noted that the aperture 53 in the backing plate 50 has a size sufficient to allow the bolt 52 to pass therethrough while preventing the spring 60 from passing therethrough.

A stop 58 is located at an opposite or free end of the bolt 52 for mounting the spring 60 onto the bolt 52. The bolt 52 has a length sufficient to space the stop 58 from the backing plate 50 with the spring 60 therebetween. In a preferred form, the stop 58 includes a washer and a nut threadably secured to the free end of the bolt 52. It is noted that the washer has a size sufficient to confine the spring 60 onto the bolt.

With reference to FIGS. 1 and 5, the air scoop 40 is mounted on the lower extension 18 of the fairing 20 adjacent to the openings 34. In mounting the scoop 40, the stop 58, the spring 60 and the backing plate 50 are removed from the bolt 52. As illustrated in FIG. 5, the free end of the bolt is inserted through one of the openings 34 in the lower extension 18. The backing plate 50, the spring 60 and the stop 58 are then reassembled on the bolt 52 by reaching through the open bottom 32 of the air space 19. It is noted that the backing plate 50 has a length sufficient to extend across the openings 34 such that the angled leg sections 51 contact the internal sidewall 28 of the lower extension 18. The leg sections 51 also space the backing plate 50 from the openings 34 and the internal sidewall 28 to facilitate passage of air through the openings 34. In addition, it is noted that the bolt 52 extends into the air space 19 between the internal sidewall 28 of the fairing and the motorcycle frame (not shown in FIG. 5).

As illustrated in FIG. 5, the spring 60 is compressed between the stop 58 and the backing plate 50. Accordingly, the spring 60 urges the stop 58 away from the backing plate 50 and thereby presses the angled leg sections 51 of the backing plate 50 against the internal sidewall 28. As the stop 58 is urged away from the backing plate 50, the air scoop 40 is thereby firmly drawn against an external sidewall 66 of the fairing 20. The gasket 49 on the free edges 47 of the skirt 46 protects the lower extension 18 from being scratched by the edges 47. In this manner, both the backing plate 50 and the air scoop 40 abut against opposite sidewalls 28, 66 of the lower extension 18 so that the fairing 20 is clamped between the air scoop 40 and the backing plate 50.

Since the spring 60 is compressible, the air scoop 40 may be grasped and moved away from the lower extension by a distance limited by the maximum compression of the spring 60. Such limited movement slidably draws the bolt 52 through the backing plate 50. The stop 58 thus moves toward the backing plate 50 along an axis of the bolt 52, and thereby compresses the spring 60. The spring 60, however, still urges the backing plate 50 against the internal sidewall 28 of the fairing 20.

Once moved away from the fairing lower extension 18, the air scoop 40 may be rotated about an axis passing through the bolt 52, as illustrated in FIG. 2. The rotation allows the inlet opening 48 of the air scoop to be selectively positioned to face either in a forward direction (as illustrated in FIG. 1) or in a rearward direction (as illustrated in FIG. 3). While the mounting mechanism 42 provides for rotation through 360°, it is noted that rotation through at least 180° is all that is necessary to position the inlet opening 48 to face forwardly or rearwardly.

After rotation, the air scoop 40 is released to allow the spring 60 to expand and thereby urge the edges 47 of the air scoop 40 back against the external sidewall 66 of the fairing 20. The expansion of the spring 60 thus slides the bolt 52 back through the backing plate 50 so that the stop 58 moves away from the backing plate 50. Consequently, the mounting mechanism 42 provides for rotation and limited outward movement of the air scoop 40, while still securely holding the air scoop 40 to the fairing.

In operation, the air scoop 40 is mounted on the lower extension 18 of a fairing 20 which has been provided with the louvered outlet duct 36. In order to channel ambient air to the rider, the inlet opening 48 of the air scoop 40 is positioned to face forwardly in an open or first position (FIG. 1). Ambient air from the windstream is then channelled through the inlet opening 48 into the interior of the air scoop 40, as represented by arrows A. The ambient air flows through the interior of the air scoop 40 and through the openings 34 into the air space 19, as illustrated in FIGS. 1 and 6. Ambient air A entering the channel of the air space 19 is then directed toward the outlet duct 36 which is selectively adjustable to direct the ambient air toward the rider. Such ambient air provides a cooling breeze effect to the rider.

It should be noted that air heated by the engine components is passing through the space 19, as illustrated by arrows H in FIG. 6. A significant portion of this heated air escapes to the atmosphere through the bottom 32 of the air space. However, a remaining portion of the heated air may flow toward the outlet duct 36 thereby warming the incoming ambient air to a certain extent. Nevertheless, an overall cooling sensation is provided for the rider by the breeze created by the ambient air A flowing through the outlet duct 36.

In order to provide a heating sensation to the rider, the air scoop 40 is pulled outwardly from the fairing and rotated 180° so that the inlet opening 48 faces rearwardly in the closed or second position, as illustrated in FIG. 3. The interior of the air scoop is then closed to the ambient air A from the windstream by the skirt 46. The ambient air flows around the air scoop 40 and is deflected to the sides of the motorcycle by the fairing.

However, heated air from the engine components is still present in the air space 19. A first portion of the heated air flows out of the air space through the bottom. Of the remaining heated air, a second portion H' will flow through the openings 34 in the fairing and into the air scoop 40 (FIGS. 3 and 7). Since the inlet opening 48 of the air scoop 40 faces rearwardly, the second portion H' of the heated air will flow through the interior of the air scoop 40 and escape to the surrounding atmosphere through the inlet opening 48.

Since the outlet duct 36 is provided, a third portion of the heated air will flow toward the outlet duct 36 as illustrated by arrows H" in FIGS. 3 and 7. The heated air can thus be directed toward the rider by the outlet duct 36. It is noted that the desired amount of both heated and cool air impinging on the rider can be adjusted by pivoting the louvers in the outlet duct 36 and/or by rotating the outlet duct 36 about the vertical axis 39.

The present invention thus provides an air channelling apparatus for selectively channelling air through openings in a motorcycle fairing. The present invention also provides a method for channelling either heated or relatively cooler air toward a motorcycle rider. In addition, the air channelling apparatus is relatively simple to construct and mount on various motorcycles.

The principles, preferred embodiment and modes of operation of the present invention have been described in the foregoing specification. The invention which is intended to be protected herein should not, however, be construed to the particular forms disclosed, as these are to be regarded as illustrative rather than restrictive. Variations and changes may be made by others without departing from the spirit of the present invention. Accordingly, it is expressly intended that all such variations and changes that fall within the spirit and scope of the present invention as defined in the claims be embraced thereby.

What is claimed is:

1. An apparatus for channelling air through openings in a motorcycle fairing, comprising:
    an air scoop including an inlet opening for communicating with an interior of the air scoop, the interior being adapted for communication with the openings in the fairing;
    mounting means for urging the air scoop against the fairing adjacent to the openings, the mounting means being adapted to permit both rotation of the air scoop through at least 180° and limited movement of the air scoop away from the fairing.

2. The apparatus as recited in claim 1, wherein the air scoop includes:
    a covering wall,
    a skirt depending from a portion of the covering wall and defining the interior of the air scoop,
    the inlet opening being defined by ends of the skirt and an edge of the covering wall.

3. The apparatus as recited in claim 1, wherein the mounting means includes:
    spring means for urging the air scoop toward the fairing; and
    plate means for abutting an inside of the fairing such that the fairing wall is clamped between the air scoop and the plate means.

4. The apparatus as recited in claim 1, wherein the mounting means includes:
    a bolt arranged in a plane generally perpendicular to the air scoop, the bolt having one end secured to the air scoop;
    a backing plate arranged in a plane generally parallel to the air scoop, the backing plate being slidably mounted on the bolt;
    spring means surrounding the bolt for urging the backing plate toward the air scoop; and
    stop means located at a free end of the bolt for retaining the spring means on the bolt between the backing plate and the stop means.

5. The apparatus as defined in claim 4, wherein the bolt extends through one of the openings in the fairing.

6. The apparatus as defined in claim 4, wherein the backing plate has means for spacing the backing plate from the openings.

7. The apparatus as defined in claim 4, wherein the spring means urges the backing plate and the stop means in opposite directions along the axis of the bolt.

8. The apparatus as defined in claim 1, wherein the fairing is spaced from sides of the motorcycle to define a longitudinal air space therebetween, the openings in the fairing communicating with the air space, and outlet means located at a rearward end of the air space for directing air from the air space toward a motorcycle rider.

9. The apparatus as defined in claim 8, wherein the outlet means comprises a duct having adjustable louvers for selectively opening and closing the outlet, the louvers when opened being adapted to direct air passing through the outlet.

10. The apparatus as recited in claim 9, wherein the outlet duct is rotatable about a vertical axis to selectively direct air passing through the outlet duct in a predetermined direction.

11. An apparatus for channelling air through openings in a fairing, comprising:
    an air scoop including
        a covering wall;
        a skirt depending from a portion of the covering wall and defining an interior of the air scoop;
        an inlet opening being defined by ends of the skirt and an edge of the covering wall, the inlet opening communicating with the interior of the air scoop;
    a bolt having one end secured to the air scoop and extending in a plane generally perpendicular thereto;
    a backing plate arranged in a plane generally parallel to the covering wall, the backing plate being slidably mounted on the bolt;
    spring means surrounding the bolt for urging the backing plate toward the air scoop; and
    stop means located at a free end of the bolt for mounting the spring means on the bolt, the spring means being confined between the backing plate and the stop means.

12. The apparatus as defined in claim 11, wherein the covering wall of the air scoop is a parallelogram and the skirt depends from each of three edges of the covering wall in a direction generally perpendicular thereto, the inlet opening being defined by the fourth edge of the covering wall and ends of the skirt.

13. The apparatus as defined in claim 11, wherein free edges of the skirt away from the covering wall are provided with a sealing gasket.

14. The apparatus as defined in claim 11, wherein the bolt is secured to a central portion of the covering wall of the air scoop.

15. The apparatus as defined in claim 11, wherein a bushing is provided on the bolt to facilitate sliding of the backing plate on the bolt.

16. The apparatus as defined in claim 11, wherein the air scoop is formed of a plastic material and the bolt is molded within the covering wall of the air scoop.

17. A method for selectively channelling air toward a rider of a motorcycle having a fairing spaced from a side of the motorcycle to define an air space therebetween, the fairing having openings communicating with the air space, the method comprising the steps of:

flowing air heated by engine components through the air space toward the openings provided through the fairing;

selectively positioning an air scoop mounted on the fairing adjacent to the openings in one of a first and second position for selectively channelling air flow through the openings, said first position channelling ambient air through the openings and said second position preventing ambient air from flowing through the openings; and directing air flow in the air space through an outlet toward the rider.

18. The method as recited in claim 17, wherein the step of selectively positioning the air scoop includes moving the air scoop away from the fairing and rotating the air scoop to one of the first and second position.

19. The method as recited in claim 17, wherein the step of selectively positioning the air scoop in the first position includes positioning an inlet opening of the air scoop to face forwardly.

20. The method as recited in claim 17, wherein the step of selectively positioning the air scoop in the second position includes positioning an inlet opening of the air scoop to face rearwardly.

* * * * *